UNITED STATES PATENT OFFICE.

MEINHARD HOFFMANN AND GEORG KALISCHER, OF FRANKFORT-ON-THE-MAIN, GERMANY, ASSIGNORS TO LEOPOLD CASSELLA & CO., OF SAME PLACE.

BROWN SULFUR DYE.

SPECIFICATION forming part of Letters Patent No. 660,058, dated October 16, 1900.

Application filed June 16, 1900. Serial No. 20,597. (Specimens.)

*To all whom it may concern:*

Be it known that we, MEINHARD HOFFMANN and GEORG KALISCHER, citizens of Prussia, and residents of Frankfort-on-the-Main, Hesse-Nassau, Kingdom of Prussia, Germany, have invented certain new and useful Improvements in Brown Sulfur Dyes and Process of Making Same, of which the following is a specification.

If the dinitro oxydiphenylamin obtained from 1.3.4 dinitrochlorbenzene and 1.4 amidophenol is heated with caustic alkalies in an aqueous solution, it is completely transformed into a brown substance. The constitution of this body has not yet been ascertained; but it must differ very considerably from the generating material, for whereas the latter when heated with alkaline sulfids and sulfur yields an intense-black coloring-matter—the known "immedial black"—the transformed product when treated in a like manner yields a characteristic brown coloring-matter. The homologous dinitrophenyl oxytolylamin from dinitrochlorbenzene and amido-o-cresol

behaves in a similar way.

Example 1: Forty kilos dinitro oxydiphenylamin dissolved in eighty kilos caustic-soda lye, 40° Baumé, and two hundred and forty liters water are boiled for from three to four hours, until no more ammonia is evolved. The solution is then diluted with water and the body formed is precipitated by slightly acidulating with muriatic acid. This body when dry is a black amorphous powder. Twenty-five kilos of the same are heated with either fifty kilos caustic-soda lye, 40° Baumé, and twenty kilos sulfur or with fifty-two kilos sulfid of sodium and thirteen kilos sulfur, with the addition of some water, and the temperature is gradually raised to about 160° centigrade. The mass finally becomes dry. The melt is used directly for dyeing.

Example 2: Twenty-five kilos dinitrophenol oxytolylamin are boiled together with fifty kilos caustic-soda lye, 40° Baumé, and one hundred and fifty liters water for several hours. Then twenty kilos sulfur are introduced and the temperature raised to 160° centigrade. The dried melt is used directly for dyeing.

The dyestuffs thus obtained dissolve easily in water. They are precipitated by acids and may be again dissolved with caustic alkalies or sulfid of sodium. They dye cotton an intense brown, especially in a warm bath containing common salt. An after treatment with chromates changes the shade toward yellow and increases the fastness.

Having thus described our invention and in what manner the same can be performed, what we claim as new, and desire to secure by Letters Patent, is—

1. The process of producing brown coloring-matters by heating a dinitro oxydialphylamin of the constitution

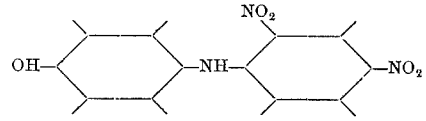

with caustic alkalies, and melting the thus-formed compound with sulfur and alkaline sulfids substantially as described.

2. The new brown dyestuff derived from dinitro oxydialphylamin hereinbefore described, which forms a blackish-brown powder easily soluble in water in presence of caustic alkalies or of alkaline sulfids, being precipitated from its solution by organic or mineral acids, dyeing cotton directly a deep brown fast to washing, to acids and oxidizing agents.

Signed at Frankfort-on-the-Main, in the Province of Hesse-Nassau and Kingdom of Prussia, this 26th day of May, A. D. 1900.

MEINHARD HOFFMANN.
  GEORG KALISCHER.

Witnesses:
 RICHARD GUENTHER,
 JEAN GRUND.